Patented Oct. 10, 1922.

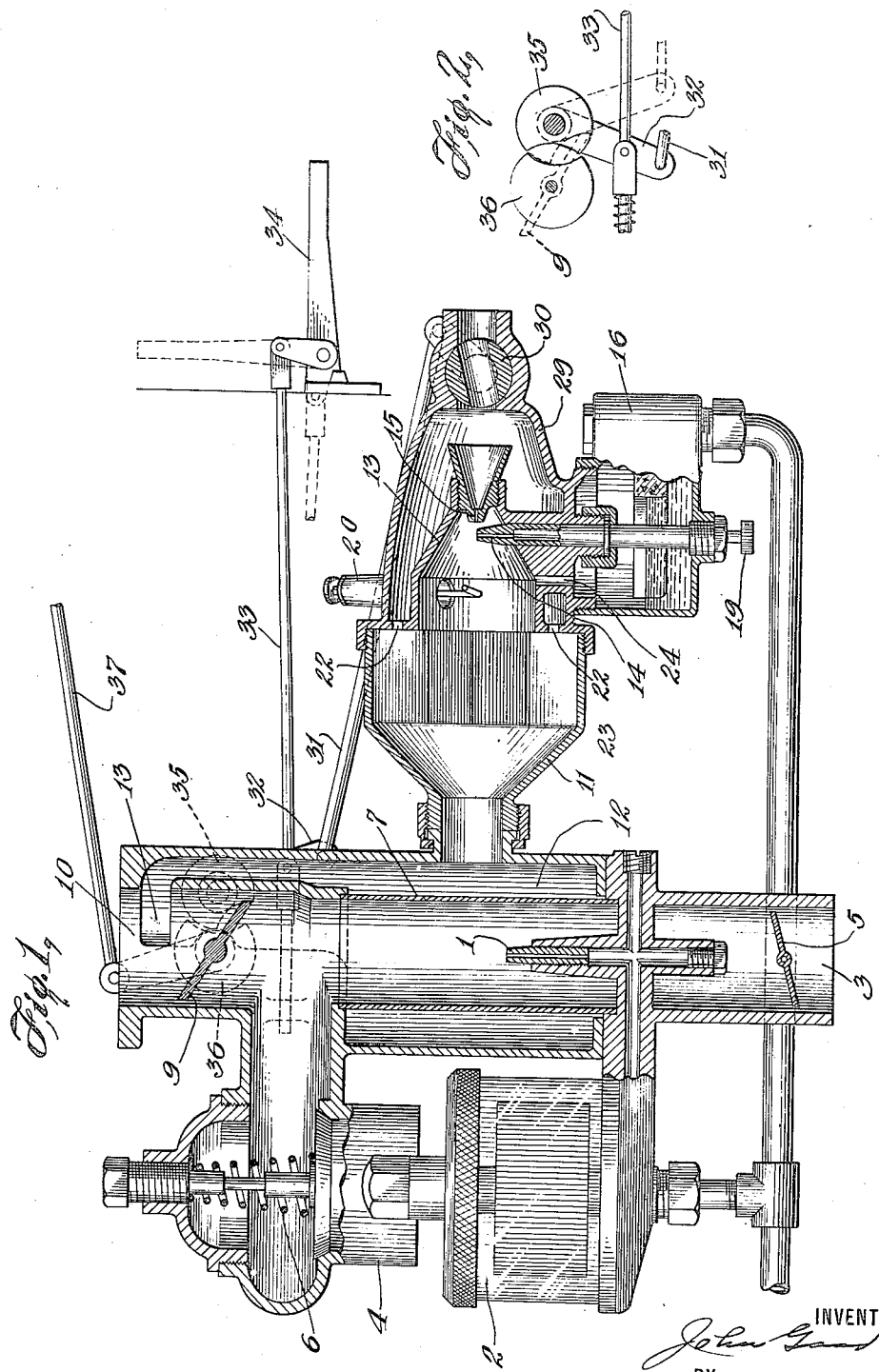

1,431,910

UNITED STATES PATENT OFFICE.

JOHN GOOD, OF GARDEN CITY, NEW YORK, ASSIGNOR TO GOOD INVENTIONS CO., OF NEW YORK, N. Y., A CORPORATION OF NEW YORK.

INTAKE BURNER APPARATUS.

Original application filed April 21, 1917, Serial No. 149,998. Now Patent No. 1,377,990, dated May 10, 1921. Divided and this application filed May 9, 1921. Serial No. 467,838.

*To all whom it may concern:*

Be it known that I, JOHN GOOD, United States citizen, residing in Garden City, Long Island, New York, have invented the following new and useful described Improvements in Intake Burner Apparatus.

The invention relates to means for operating and starting internal combustion engines, particularly automotive engines, and consists in the combination with a charge-forming device of such engines, of a burner means adapted to furnish a hot combustible gaseous medium to the engine intake by the aid of which the engine can be promptly started in extremely cold weather and can also be operated with efficiency and elimination of tendency of knock after starting and whereby various collateral advantages are obtained as will be apparent to those skilled in the art. This application is for divisible subject matter of my copending application Serial No. 149,998, filed April 21, 1917, renewed March 23, 1920, Serial No. 368,158, now Patent No. 1,377,990, May 10, 1921, being directed particularly to the means for mechanically controlling the rate of combustion in the burner as well as to other matter hereinafter appearing.

In the accompanying drawing illustrating the present invention, Fig. 1 is a sectional elevation of a combined carburetor and burner arranged for attachment to the manifold of the engine. Fig. 2 is a detail.

The charge proportioner illustrated will be recognized to be of the conventional type of carburetor comprising a fuel nozzle 1 supplied with fuel from a float chamber 2 and having primary and secondary air inlets 3 and 4 respectively and the usual choker 5. The fuel nozzle will be understood to be correlated to the primary inlet 3 and to the valve spring 6 of the secondary air inlet 4, so as to keep the charge mixture delivered to the engine within the limits of an explosive mixture as customary in engine carburetors. These fuel and air entrances, however arranged for this purpose, constitute a charge-mixture supply device adapted to give a variable delivery of charge-mixture to the engine according to the manipulation of the throttle 9. The choker valve 5 may be closed as usual in order to give an overrich mixture to the engine. The mixture passes at 10 into the connection to the engine manifold which directs it to the different cylinders; the connection may be exhaust heated as illustrated, by way of example, in the parent application above referred to.

The supplemental combustion apparatus comprises a suction-operated flame-producing device or burner head 11 discharging its flame and combustion products through an annular combustion cavity 12 into the suction intake of the engine, preferably on the inside or the engine side of the throttle 9, and desirably through a restricted outlet 13. The combustion chamber or flame passage 12 may be variously related to the engine and its charge forming apparatus for the purpose of this invention but as preferred and shown is elongated straight-away in form, extended along the carburetor portion of the intake, having its connection to the burner at one end and its outlet 13 at the other so as to provide a substantially direct passage for the heated gases substantially longitudinal to the intake passage. The connection to the burner head is preferably short so that the wall 7 of the mixing space adjacent the nozzle becomes highly heated by the flame from the burner. The burner head comprises a main casing or body formed with a nozzle cap 13 concentric with the burner axis and in which are mounted a liquid fuel nozzle 14 and an air nozzle 15 in aspirating relation to the fuel nozzle. The said air nozzle may be merely a restricted entrance for atmospheric air. The fuel nozzle 14 takes liquid fuel from a constant level fuel receptacle 16 (supplied with the same fuel as used by the engine) at a rate proportionate to the velocity of the air jet flowing from the air nozzle 15 and subject to adjustment by its needle valve 19. The fine spray produced by these nozzles is ignited by a pair of single pole spark plugs 20, the electrode terminals of which extend convergently downward from cavities in the upper part of the nozzle cap directly into the spray and are there bent convergently upwards and slightly toward the spray nozzle, like hooks, so that liquid impinging thereon is drained away from the gap and thereby short-circuiting of the cap by liquid is prevented; in consequence, ignition may be reliably accomplished by current of low value. The self-draining shape of the electrodes is particularly desirably where the engine fuel used is kerosene, or where they are operated by moderate current. Prompt electrode ignition of the mixture, even in a cold state, is accomplished by the fine shattering of the fuel liquid and its mixture with air, which is the principal function of nozzles 14 and 15 and which effect is enhanced by the fact that the burner head receives air at atmospheric pressure or at least at a pressure considerably higher than exists in the mixture passage of the intake.

Air to support combustion of the spray is admitted into contact with it immediately beyond its point of ignition and in such a manner as to avoid dilution of the spray at that point. Dilution of the spray at the igniter may prevent ignition completely or produce explosion. The additional air may be added in various ways, as shown particularly in the parent case above referred to, and in the device illustrated herewith, passes into the ignited mixture through a series of holes 22 distributed around the flame end of the nozzle cap 13 (passing thence between the wings of a star-piece member 23), being thus brought into contact with the mixture uniformly on all sides thereof and without diluting or distorting it at its point of ignition. A drain hole 24 may be provided in the bottom of the burner to return to the float chamber 16 any drip of liquid fuel, and such hole also establishes equality of pressure between the ignition space and the float chamber.

The burner is mechanically controlled by, that is to say, its rate of combustion is subject to the control of, the turn valve 30 which is located in advance of the flame. By locating this valve means in a passage leading toward the flame, rather than in the path of the flame, the valve is not subject to the heat of the flame and hence is simpler to construct and maintain. In the present instance, the valve 30 is located in the single air entrance of the burner, provided in the inclosing cap 29, where it may intercept the flow of air from the atmosphere to both the atomizing air nozzle 15 and the combustion air openings 22 and therefore control the flow to the flame without substantially changing the fuel and air proportions which are determined by the nozzles 14 and 15. This valve is arranged to be operated, in the present instance, by a link 31, crank arm 32 and rod 33 actuated by a pedal or hand lever 34 which may be assumed to be mounted on the dash of an automobile. The hub 35 of the crank arm 32 is interlocked with a hub 36 of the engine throttle 9 by the circular cut-out formation in each of the hubs. These cut-outs, it will be seen, are so arranged that the throttle cannot be widely opened until after the lever 34 has been set to close the turn valve 30 to stop the burner. By such means the operator is compelled to close or nearly close the throttle before he can start the burner and to stop the latter before he can open or further open the throttle, this arrangement being useful in gasoline engines to avoid the waste of fuel by failure to stop the burner and to insure adequate suction for starting the burner. In so far as the cut-outs permit, the throttle and the turn valve 30 are independently controllable, the first through the usual throttle connections 37 and the second through the lever 34.

Assuming the spark plugs 20 to be suitably connected to an ignition circuit, such for example as the secondary of a vibrating spark coil the primary of which is supplied from a battery which may be assumed to be the storage battery for the igniting and lighting system of the automobile, and assuming the turn valve 30 to be open, then the cranking of the engine, either by hand or a starting motor, causes a suction effect in the burner head; this in turn causes a high air velocity through the nozzle 15 which induces a fuel spray from the nozzle 14, and a current of larger volume to enter through the openings or ports 22. The spray first encounters the spark and is ignited and immediately joins the air current from the ports 22, a continuous flame is thereby produced extending into or through the flame tube or passage 12 and of a greater or less intensity according to the suction produced by the engine. The relation of the liquid fuel orifice 14 to its associated air orifice 15 serves to maintain predetermined proportions of fuel and air in the burner besides serving as a fuel shattering means and the combustion device is automatically ignited in the sense that, with the ignition circuits closed, the mere effect of the engine suction establishes the burner flame without any preliminary attention or manipulation on the part of the operator; the particular arrangement of the burner parts, as above described, produces a mixture condition which not only permits instant and non-explosive ignition even of kerosene fuel but also positively controls the mixture proportions after ignition and regardless of change of strength of the suction, which latter effects only the rate of combustion or flame delivery. These effects are independent of the position or manipulation of the turn valve 30 through which manual or other mechanical control of the flame is exercised and which may be opened and closed at will, subject in the present instance to the interlocking with the throttle, to adjust the rate of combustion even to the extent of extinguishing the flame. The mixture proportions during combustion are preferably those of an explosive mixture and result in a steady clean burning flame. Explosion does not result from ignition because the spark occurs in a relatively rich mixture, too rich to explode though capable of igniting and continuing the inflammation.

Thus the mere cranking of the engine with the ignition established, automatically creates a continuous heated flow through the intake and engine passages, heating them (and particularly the mixing chamber close to the fuel nozzle 1 of the carburetor) and eventually escaping through the normal exhaust; the wall 7 of the flame passage adjacent the carburetor nozzle may in fact be brought to a bright red heat in a few seconds. If the throttle 9 should be opened during the cranking of the engine, the engine suction is communicated to the carburetor and induces an air flow through the primary inlet 3 and a discharge of fuel spray from the nozzle 1 contemporaneous with the ignition of the combustion device; if on the other hand the throttle 9 should be held closed during the initial combustion of the device 11, the ultimate opening of the throttle 9 brings the carburetor into action. In either event, the spray may be delivered into direct contact with the heated wall 7 of the flame passage or into the highly heated region surrounded by this wall, to cause or assist its vaporization, so as to pass onward toward the engine with the carburetor air as an explosive mixture more or less completely vaporized. Beyond the throttle 9 the charge mixture encounters the hot gases issuing from the port 13 from the flame tube, to be further heated or vaporized by such contact, the amounts of such gases being mechanically controllable by the valve means 30 as aforesaid. Relatively large amounts of flame products from the flame tube 12 may be introduced in this manner into the initial engine charges without impairing their explosive qualities for starting or for even running the engine. The inter-linkage 35 and 36 may therefore be designed, as before described, so that the turn valve 30 is not entirely closed, to extinguish the combustion device, until after the throttle is well opened or open to some predetermined extent at which the engine is sure to have been well started; the manual control through the turn valve 30 is additional to the automatic control of the combustion rate, which is affected by the change or dimension of the strength of the engine suction, as before pointed out. The closing of the turn valve 30 may be done gradually with no other effect than to diminish the intensity of the flame down to a point where the flame is extinguished. Immediately on reopening the turn valve 30 the combustion will be resumed automatically by the effect of the suction produced by the combustion operation of the engine, it being apparent that the independent combustion in the burner can be used to supplement the normal engine heat whenever and to whatever extent desired. The particular linkage mechanism shown is merely illustrative of one form of mechanical control, and it will be understood that the manner of mechanical control, whether automatic or manual, is susceptible of wide variation and that the supplemental induced combustion may be variously applied to the engine and also that the flame tube may serve to heat any other part than the carburetor proper. The control of the relative proportions of the fuel and air drawn into the flame producing device, so that they are substantially constant during its use, as above described, exercises important effects and possesses advantages that are pointed out in the parent application referred to.

I claim:

1. The combination of an internal combustion engine having a carburetor, a non-explosive flame-producing device, connected to the intake side of the engine, so that the engine suction causes the air flow which produces the flame, and valve means for the total air flow through the flame-producing device located in advance of the flame to mechanically control the operation of said device.

2. The combination of an internal combustion engine having a charge-forming device, and a flame-producing device co-operating therewith to vaporize the fuel and provided with valve means, located in advance of the flame, to mechanically control the operation of said device without substantially changing the proportions of fuel and air in said device.

3. The combination of an internal combustion engine having a charge-forming device, and a flame-producing device for co-operating therewith to vaporize the fuel and provided with mechanical means, located outside the path of the heated products of the device, to mechanically control the rate of combustion without substantially changing the fuel and air proportions in said device.

4. The combination of an internal combustion engine having a charge-forming device and an engine-suction-operated non-explosive flame-producing device co-operating therewith to vaporize the fuel and having valve means located in its air entrance means to mechanically control the flow of air into said flame device.

5. The combination of an internal combustion engine having a charge-forming device, an engine-suction-operated flame-producing device co-operating therewith to vaporize the fuel and provided with a valve in a passage leading toward the flame to control the flow of the flame without substantially changing the proportions of fuel and air, and means for operating said valve while the engine is in operation to control the rate of combustion.

6. The combination with an internal combustion engine having a suction intake, a charge-forming device connected to it and a throttle controlling the charge mixture, of a flame-producing device arranged to heat the charge mixture and having valve means located in advance of the flame and correlated to said throttle whereby said flame-producing device is controlled according to the throttle position.

7. In an internal combustion engine, a suction intake passage, a charge-forming device therefor, a flame-producing device and an elongated straight-away flame-passage extending along the intake passage to transmit heat thereto by conduction through a wall thereof, one end of the flame passage being connected to the flame-producing device and the other being provided with the flame-passage outlet whereby the flame-passage provides an elongated substantially direct path for the flame longitudinally of the intake passage.

In testimony whereof, I have signed this specification.

JOHN GOOD.